Figure 2:
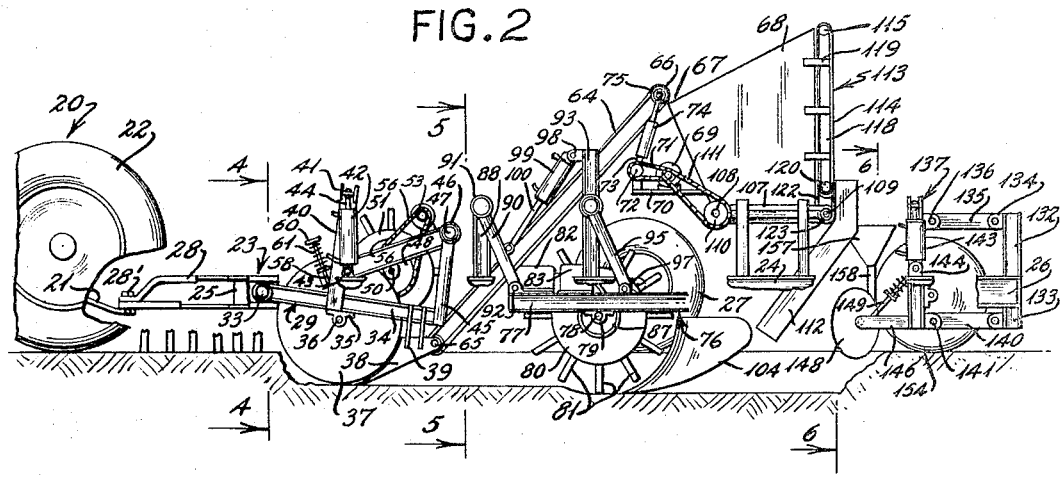

Dec. 27, 1966  V. A. BOOTS  3,294,046
METHOD AND APPARATUS FOR REJUVENATING SUGAR CANE STUBBLE
Filed Dec. 8, 1964  4 Sheets-Sheet 1

INVENTOR
VERNIE A. BOOTS
BY
ATTORNEY

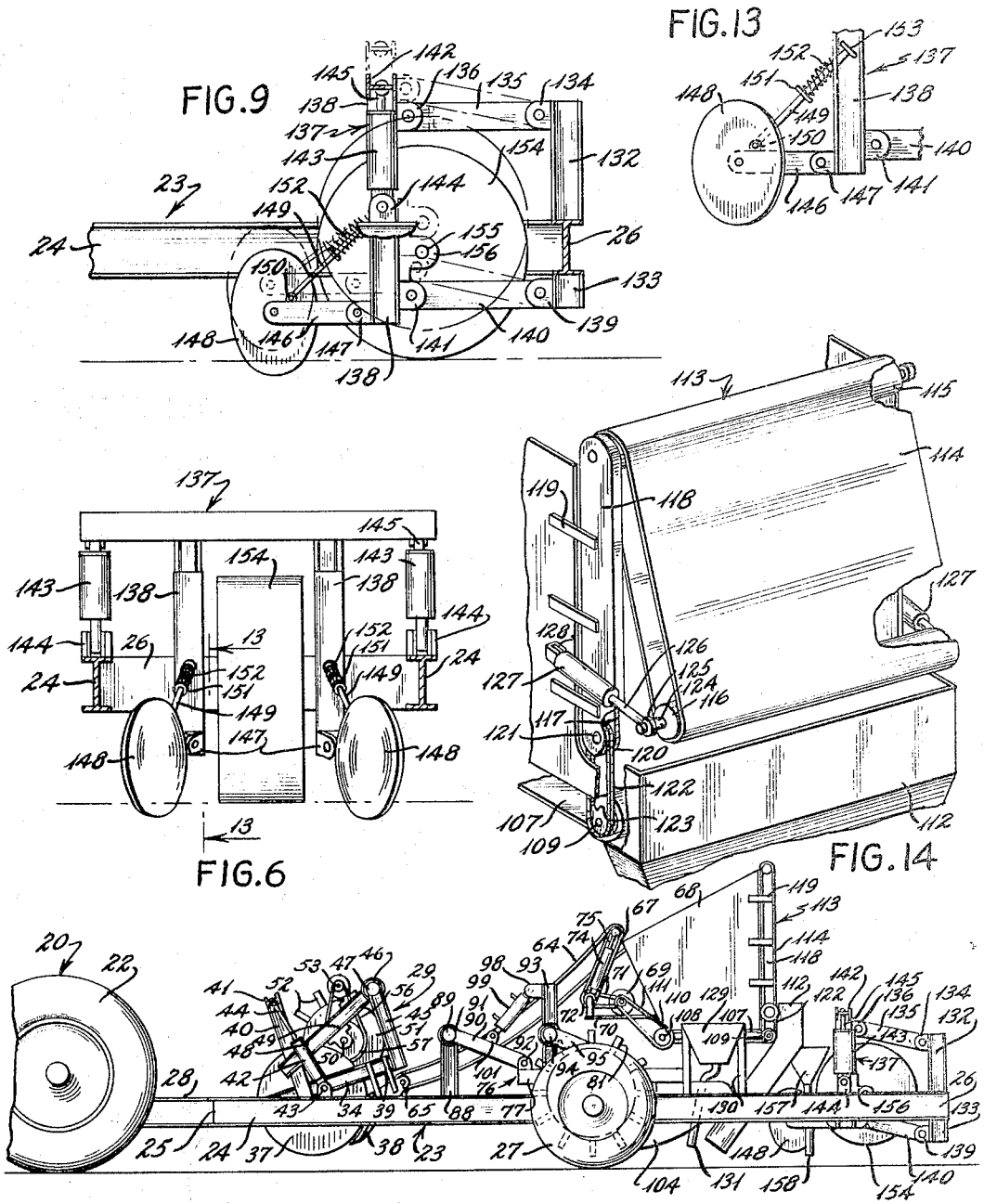

Dec. 27, 1966          V. A. BOOTS          3,294,046
METHOD AND APPARATUS FOR REJUVENATING SUGAR CANE STUBBLE
Filed Dec. 8, 1964                    4 Sheets-Sheet 3
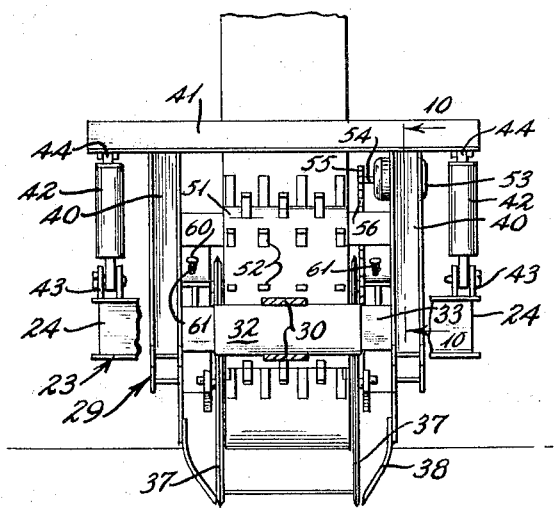
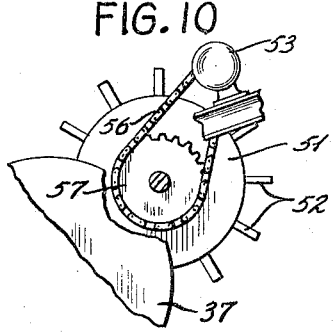
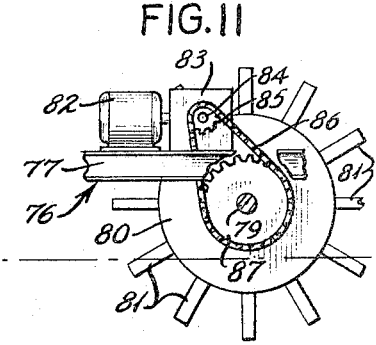
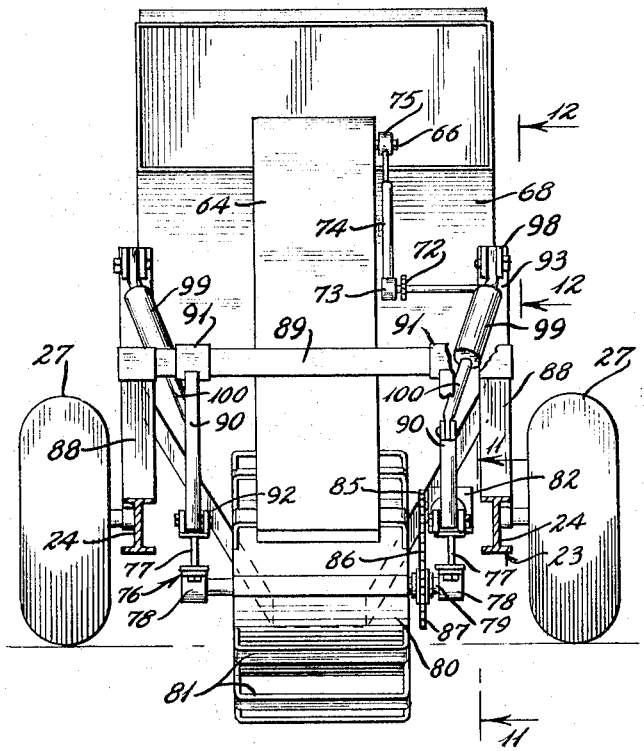
INVENTOR
VERNIE A. BOOTS
BY
ATTORNEY Dec. 27, 1966 V. A. BOOTS 3,294,046
METHOD AND APPARATUS FOR REJUVENATING SUGAR CANE STUBBLE
Filed Dec. 8, 1964 4 Sheets-Sheet 4

INVENTOR
VERNIE A. BOOTS

BY
ATTORNEY

United States Patent Office 3,294,046
Patented Dec. 27, 1966

3,294,046
METHOD AND APPARATUS FOR REJUVENATING
SUGAR CANE STUBBLE
Vernie A. Boots, P.O. Box 456,
Belle Glade, Fla. 33430
Filed Dec. 8, 1964, Ser. No. 416,772
12 Claims. (Cl. 111—3)

This invention relates to the cultivation of the soil and to apparatus and equipment utilized in the prepartion of the soil for planting as well as the placing of growing matter therein.

The invention relates particularly to apparatus utilized in sugar cane fields for removing stubble from the earth, conditioning the soil, and replanting the stubble to encourage growth of cane, as well as to the method by which such steps are accomplished.

Until recently, a large portion of the sugar utilized in this country was imported and refined for domestic use; however, due to certain political and economic reasons the amount of imported sugar has been greatly reduced. This has required the domestic sugar producing industry to expand and to open thousands of acres of virgin land and to convert other crop lands to the producing of sugar crops. Also the industry has had to produce new machinery which has not heretofore been available or necessary. This has resulted in many new problems, some of which are:

(1) When the cane growing in new land is cut, it promptly begins new growth which must survive the winter's cold weather. If the terminal buds or growth are lost, some of the stubble which produces new growth will die and the amount, and consequently the value, of the crop is reduced.

(2) Rapid oxidation and compaction of the new soil causes the row of stubble to become ridged which exposes stubble to cold and to mechanical damage.

(3) The accumulation of dead growth in new as well as old soil makes it difficult to efficiently fertilize the growing plants and at times causes the new growth to move out of the row where it will be damaged by cultivation.

(4) The control of insect and disease infestation is difficult because of the necessity of placing poison or other chemicals into direct contact with the area of infestation.

It is an object of the invention to provide apparatus which may be self-propelled or drawn by a propelling vehicle and which will remove cane stubble from the earth, condition the soil, and replant the stubble automatically in a minimum of time and with a minimum of skilled labor.

Another object of the invention is to provide a sugar cane stubble rejuvenator which will remove cane stubble from the earth, condition the soil, and replant the stubble auotmatically while simultaneously selectively adding fertilizer and insect or disease combatants.

Still another object of the invention is to provide a sugar cane stubble rejuvenator which will remove cane stubble from the earth, condition the soil, and replant the stubble in equally spaced rows to encourage growth without gaps.

A further object of the invention is to provide a cane stubble rejuvenator which will remove cane stubble from the earth, break the stubble into relatively small pieces of a convenient planting size, conveying such stubble into a hopper, condition the soil, and replant the stubble in equally spaced rows.

Figure 1:
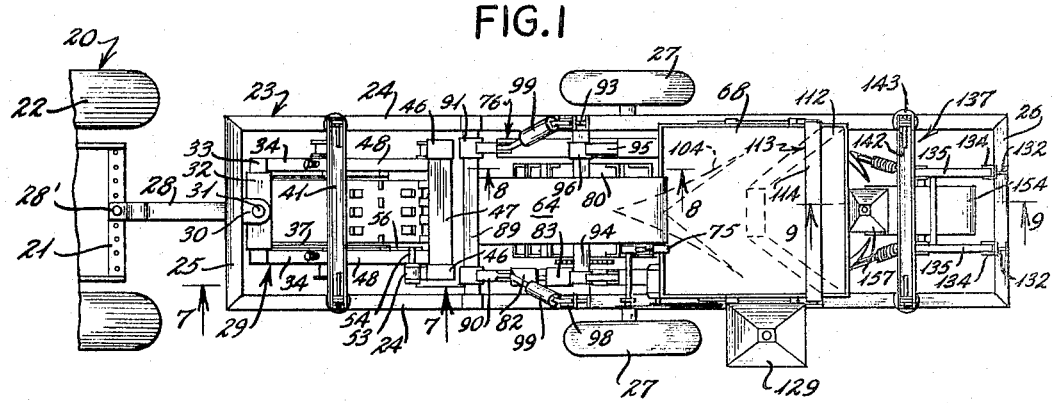
Figure 15:
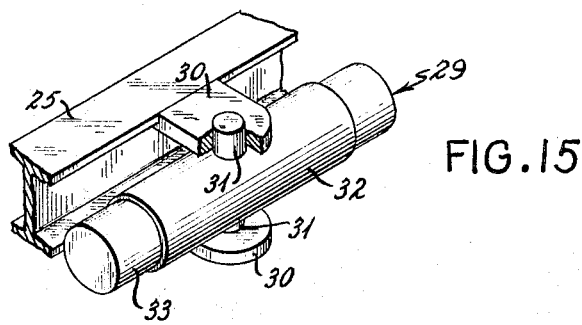
Figure 7:
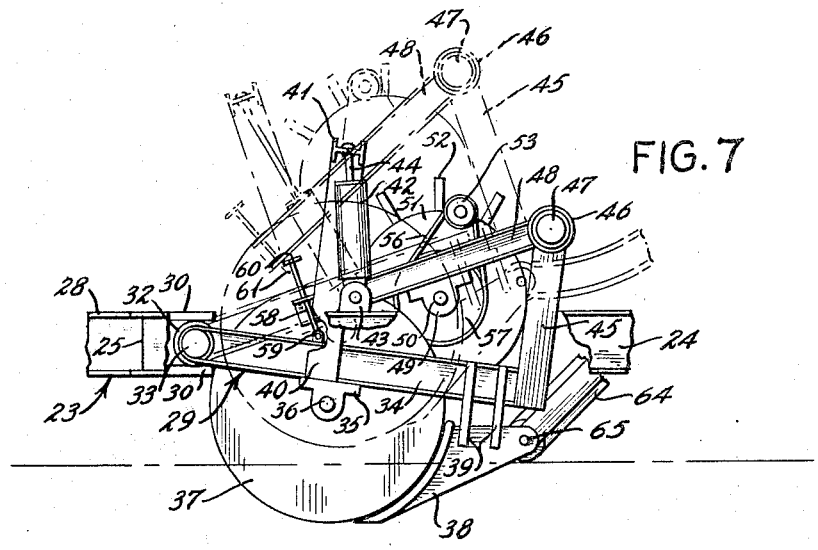
Figure 8:
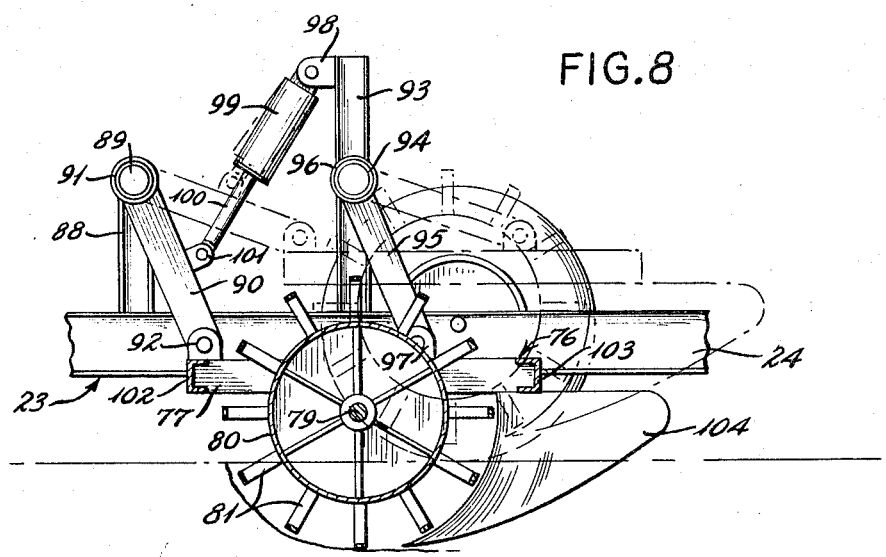

Other objects and advantages of the invention will be apparent from the following description taken in conjunction with the accompanying drawings in which:

FIG. 1 is a top plan view illustrating the apparatus of the present invention;

FIG. 2, a side elevation thereof with portions broken away for clarity;

FIG. 3, a side elevation illustrating the apparatus in condition for transporting;

FIG. 4, an enlarged vertical section on the line 4—4 of FIG. 2;

FIG. 5, an enlarged vertical section on the line 5—5 of FIG. 2;

FIG. 6, an enlarged vertical section on the line 6—6 of FIG. 2;

FIG. 7, an enlarged longitudinal section on the line 7—7 of FIG. 1;

FIG. 8, an enlarged longitudinal section on the line 8—8 of FIG. 1;

FIG. 9, an enlarged longitudinal section on the line 9—9 of FIG. 1;

FIG. 10, a vertical section on the line 10—10 of FIG. 4;

FIG. 11, a vertical section on the line 11—11 of FIG. 5;

FIG. 12, a side view on the line 12—12 of FIG. 5;

FIG. 13, a vertical section on the line 13—13 of FIG. 6;

FIG. 14, an enlarged perspective illustrating the adjustable hopper discharge gate; and FIG. 15, an enlarged perspective of the universal mounting of one of the implements.

Briefly stated the present invention is a sugar cane stubble rejuvenator which may be either self-propelled or drawn by a propelling vehicle and will travel along a row of cane stubble after the cane stalks have been harvested to remove the stubble from the earth, break the large pieces of stubble into smaller planting size pieces, pulverize and condition the soil, and replant the pieces of stubble in equally spaced rows. The machine has hoppers or containers for fertilizer and chemical insect and disease combatants which can be selectively operated to dispense either fertilizer or chemical as desired.

With continued reference to the drawings, a tractor or other propelling vehicle 20 is provided having a draft bar 21 and ground-engaging wheels 22. A stubble rejuvenator adapted to be propelled by the tractor 20 is illustrated and includes an elongated main frame 23 constructed of structural side members 24 and front and rear end members 25 and 26 respectively. Such frame is supported by ground-engaging wheels 27 and has a tongue 28 fixed to the front end member 25 which is connectable to the draft bar 21 by a connecting pin 28' or the like.

An auxiliary frame 29 is pivotally connected to the main frame 23 and located between the side members 24. Such auxiliary frame includes a pair of spaced generally parallel lugs 30 mounted on the front end member 25 and extending rearwardly therefrom for the reception of pins 31 fixed to opposite sides of a sleeve 32 so that such sleeve is pivotally mounted in a generally horizontal plane. A rod or shaft 33 is rotatably mounted within the sleeve 32 and projects outwardly from both ends thereof. A rearwardly extending arm 34 is mounted at one end to each end of the rod 33 to permit free up and down movement of the opposite ends of such arms. A pillow block type bearing 35 is mounted on each of the arms 35 of the auxiliary frame 29 intermediate the ends and such bearings receive a shaft 36 on which spaced colters or blades 37 are freely rotatably mounted. The colters penetrate the earth along each side of the row of cane stubble to sever the laterally extending roots. Directly behind the colters is a combination lifter shoe and breast plate 38 which extends laterally between such colters to engage the cane stubble and raise it out of the earth. The combination lifter shoe and breast plate are supported from the arms 34 by brackets 39 located adjacent the free ends of such arms.

In order to tilt the auxiliary frame 29 to control the depth of penetration of the colters 37 and the lifter shoe 38, an upstanding post 40 is attached to each of the arms 34 intermediate the ends thereof and such posts are connected by an upper cross member 41 which extends outwardly beyond each post to a position overlying the side members 24 of the main frame. A fluid operated cylinder 42 is pivotally mounted on lugs 43 carried by each of the side members 24 and such cylinders have piston rods 44 the outer ends of which are pivotally connected to the cross member 41 so that when the cylinders are operated the arms and the elements mounted thereon will be tilted about the shaft 33.

A second upstanding post 45 is fixed to the free end of each of the arms 34 and such second posts have a sleeve type bearing 46 fixed to the upper end thereof and adapted to rotatably receive a rod or shaft 47. A forwardly extending arm 48 is fixed to the shaft at each side in position to overlie the arms 34. Each of the forwardly extending arms 48 has a bearing 49 which rotatably receives a shaft 50 on which a drum 51 is rotatably mounted. The drum 51 has a plurality of rows of staggered teeth or projections 52 for a purpose which will be described later and such drum is adapted to be positively driven by means of an electric hydraulic motor 53 having a shaft 54 on which a drive sprocket 55 is mounted. The drive sprocket drives a chain 56 which in turn drives a driven sprocket 57 carried by the drum 51. Preferably each of the arms 48 is spring loaded in a downwardly direction by means of a rod 58 pivotally mounted on lugs 59 (FIG. 7) and such rod extends upwardly through openings in the arms 48 and terminates in a cap or stop 60. A compression spring 61 is disposed between the cap and the arm to urge the arm downwardly.

An endless shaker chain conveyor 64 is rotatably mounted at one end about an axle 65 carried by the combination lifter shoe and breast plate and the other end of such conveyor is rotatably mounted about an axle 66 supported by brackets 67 carried by a hopper 68 at a substantially higher elevation. The chain conveyor extends upwardly relatively close to the projections 52 on the drum 51 so that as the lifter shoe raises the cane stubble out of the earth the projections on the drum will break apart the stubble clumps and loosen the soil which will fall through the shaker chain conveyor as the stubble is being raised and deposited within the hopper 68. In order to prevent damage to the teeth or projections 52, the arms 48 can move outwardly and upwardly against the tension of the spring 61 to permit large material such as stones or the like to pass under the projections.

The shaker chain conveyor is driven by a motor 69 mounted on a platform 70 supported by the hopper 68 and such motor drives a chain 71 which in turn drives a sprocket 72 carried by a right-angle gear box 73. A telescopic drive shaft 74 is connected to the gear box 73 and is driven thereby. At the opposite end, such drive shaft drives a second right-angle gear box 75 which rotates the axle 66 to drive the chain conveyor 64.

After the lifter shoe has raised the cane stubble from the ground, the earth is adapted to be cultivated and the residual root mass is adapted to be cut up into relatively small portions to accelerate the disintegration thereof and to make the soil more friable. In order to accomplish this a tiller frame 76 is provided which includes generally parallel side members 77 each of which has a bearing 78 mounted intermediate the ends thereof and such bearings rotatably receive an axle 79. A drum 80 is fixed to the axle 79 and such drum has a plurality of generally U-shaped knives or blades 81 extending radially outwardly thereof which penetrate and work the soil and cut the residual root mass into relatively small pieces. In order to rotate the drum 80 an electric or hydraulic motor 82 is provided for driving a gear reducer or transmission 83 having an output shaft 84 with a drive sprocket 85 thereon which drives a chain 86 and a driven sprocket 87 fixed to the drum 80. If desired the gear reducer 83 may be of either the fixed or variable variety so that if desired the speed of rotation of the drum could be varied according to soil conditions.

In order to raise and lower the tiller frame 76 to control the depth of penetration of the knives 81 or to raise such knives out of engagement with the ground, an upright post 88 is mounted on each of the side members 24 of the main frame 23 and a shaft 89 is mounted on the upper end of each post. A pair of spaced links 90 are rotatably mounted on the shaft 89 by means of sleeve type bearings 91 fixed to one end to the shaft 89 and the opposite end of each link is pivotally connected to a bracket 92 mounted on the forward end of each of the side members 77. A second substantially longer post 93 is mounted on each of the side members 24 in spaced relation to the posts 88 and such second posts are connected by a shaft 94 located substantially at the same height as the shaft 89. A pair of links 95 are rotatably connected at one end of the shaft 94 by means of sleeve type bearings 96 and are rotatably connected at the opposite end to brackets 97 mounted intermediate the ends of the side members 77 of the tiller frame. At the upper end of the second posts 93, a pair of lugs 98 project forwardly and pivotally receive one end of a fluid cylinder 99 having a piston rod 100, the free end of which is pivotally connected to lugs 101 carried by the links 90. As will be apparent from FIG. 8 operation of the fluid cylinder 99 will cause the tiller frame to move from the full line position to the phantom line position or any desired position in between to raise or lower the tiller frame 76 and dispose the knives 81 at any elevation.

Preferably the side members 77 are connected by front and rear members 102 and 103 respectively for added rigidity. After the soil has been worked by the knives 81 a furrow is opened to receive pieces of sugar cane stubble from the hopper 68. This is done by providing a plow or tiller blade 104 immediately behind the knives 81 of the drum 80 and such blade is supported by the rear member 103. Preferably the tiller blade 104 directs soil upwardly and outwardly to both sides of the furrow.

With reference to FIGS. 1, 2, 3 and 14, a hopper 68, is provided with a live bottom in the form of an endless conveyor 107 mounted on front and rear axles 108 and 109 respectively, supported by the hopper 68. The front axle 108 carries a sprocket 110 driven by a chain 111 from the motor 69 to cause material from the hopper to be discharged from the rear of the hopper 68 into a material chute 112, such chute being of a configuration to discharge the stubble into the furrow created by the tiller blade 104.

In order to regulate the amount of material being discharged from the hopper, an adjustable gate 113 is provided which forms the rear wall of the hopper and includes an endless belt 114 mounted on upper and lower rollers 115 and 116 respectively. The upper roller 115 is driven by a chain 117 carried within a housing 118 supported from the hopper 68 by a plurality of support plates 119. The chain 117 extends around a double sprocket 120 mounted on an axle 121 at the bottom of the housing 118 and such double sprocket is driven by a chain 122 from a sprocket 123 mounted on and driven by the rear axle 109 of the conveyor 107 in such a manner that when the endless conveyor 107 is operated, the endless belt 114 also will be operated. To regulate the discharge opening, the lower roller 116 has an axle 124 extending from both ends thereof and each end is rotatably received within a bearing 125 carried by a piston rod 126 of a fluid cylinder 127 which is rotatably mounted on a bracket 128 carried by the hopper 68. When the cylinders 127 are operated the endless belt 114 is pivoted about the upper roller 115 and the lower roller 116 will move through an arc to control the size of the discharge opening from the hopper.

If desired a hopper or container 129 for fertilizer or other chemical in granular, powder or liquid form may be supported by brackets 130 mounted on the main frame 23. A flexible discharge pipe 131 having a conventional cut-off valve (not shown) extends from the bottom of the hopper inwardly and downwardly to discharge fertilizer or other material into the furrow or such fertilizer may be discharged onto the earth at the side of the furrow so that after the furrow is filled in the fertilizer will be available to the plants when they begin to grow.

When the stubble has been placed in the furrow, the soil must be returned to fill the furrow and cover such stubble to permit the cane to grow. In order to do this a pair of spaced upwardly extending posts 132 and a pair of spaced downwardly extending posts 133 are mounted on the rear end member 26 with such upwardly and downwardly extending posts being substantially in alignment. A pair of lugs 134 on each of the upwardly extending posts 132 pivotally receive one end of a link 135 the opposite end of which is pivotally connected to lugs 136 carried by a floating frame 137 having a pair of spaced generally vertical posts 138. Each of the downwardly extending posts 133 has a pair of lugs 139 which pivotally receive one end of a link 140 the opposite end of which is pivotally mounted on lugs 141 carried by the posts 138 to form substantially a parallelogram. The generally vertical posts 138 are connected by an upper cross member 142 which extends outwardly beyond the posts to a position overlying the side members 24 of the main frame 23. In order to raise and lower the floating frame 137 a fluid cylinder 143 is pivotally mounted on lugs 144 carried by each of the side members 24 and each of such fluid cylinders has an extendable and retractable piston rod 145 pivotally connected to the upper cross member 142.

An angularly disposed arm 146 is pivotally connected on lugs 147 fixed to the lower portion of each of the generally vertical posts 138 and a disk 148 is rotatably mounted on the free end of each of the arms 146. The disks are spaced apart a distance substantially equal to the width of the tiller blade 104 so that the disks will engage the earth which has been turned by the tiller blade and direct such earth back into the furrow to cover the cane stubble. In order to urge the disks downwardly a rod 149 is pivotally mounted on lugs 150 carried by the arms 146 and such rods extend upwardly and rearwardly through the posts 138. A collar 151 is mounted on the rod intermediate the posts and the lugs and a compression spring 152 is disposed between the collar and the posts. The rod 149 terminates in a cap 153 to limit the movement of the arms 146 in a downward direction.

When the furrow has been filled, the earth is adapted to be compacted to remove air pockets and to encourage growth of the stubble. This compaction of the soil is caused by a relatively wide packing wheel 154 mounted on a shaft 155 carried by bearings 156 on the floating frame 137. The tension on the packing wheel 154 is controlled by movement of the floating frame 137 through the action of the fluid cylinders 143.

A hopper or container 157 is connected to the rear portion of the chute 112 and is adapted to contain chemical insect or disease combatants in granular or liquid form. The hopper has a discharge chute 158 with a conventional cut-off valve (not shown) for directing material from the hopper 157 to the earth and such material may be discharged into the bottom of the furrow before the earth is filled in, or on top of the earth after the furrow has been filled, as desired.

In the operation of the device the rejuvenator for sugar cane stubble is moved through a field from which the sugar cane stalks have been harvested. The colters 37 penetrate the earth and sever the laterally extending roots so that the lifter shoe 38, which penetrates the earth to a position below the major portion of the root systems, will remove the stubble from the ground and will move such stubble upwardly onto the shaker chain conveyor 64. As the stubble is being placed on the conveyor 64 the teeth or projections 52 of the drum 51 will engage such stubble, will break the clumps into smaller planting size portions, and will loosen the soil about the roots. As the stubble is moved upwardly by the shaker chain conveyor the loose dirt will fall by gravity back to the earth and the small portions of stubble are discharged into the hopper 68. Simultaneously the drum 80 is being driven by the motor 82 and the knives or blades 81 on such drum will penetrate the earth to cultivate the same and to cut any residual roots into relatively small pieces to promote disintegration thereof and to render the soil more friable. The plow or tiller blade 104, which is located directly behind the knives 81, will then form a furrow in the earth. The planting size portions of stubble which have been placed in the hopper 68 will be discharged therefrom by the endless conveyor 107 into the material chute 112 where they will fall by gravity into the furrow formed by the tiller blade 104. If desired fertilizer can be added directly to the area of the stubble or can be added to the dirt along the sides of the furrow so that when the furrow is filled in the fertilizer will be available to the plants when they begin their regrowth.

After the stubble is placed in the furrow the disks 148 will engage the soil and will move the soil back into the furrow to cover the stubble therein. After the furrow has been filled the packing wheel 154 will cause compaction of the soil to remove air pockets and to tamp the stubble firmly in position. Chemical insect and disease combatants can be selectively added either before or after the furrow has been filled to prevent insect and disease infestations.

It is noted that although a rejuvenator for sugar cane stubble has been illustrated and described as a trailer type apparatus adapted to be drawn by a propelling vehicle, it is contemplated that the device could be a self-propelled unit by the addition of drive and steering mechanisms of conventional design.

It will be apparent that a rejuvenator for sugar cane stubble has been provided which will remove stubble from the ground, break the stubble into planting size portions, cultivate the soil, open a furrow, discharge the stubble into the furrow, and then close and pack the soil. If desired fertilizer can be dispensed in any desired amount to encourage growth of the stubble and an insect and disease combatant can be added to prevent infestations of the same.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for rejuvenating sugar cane stubble comprising a main frame having ground-engaging wheels, said frame having generally parallel side members connected by front and rear end members, means for propelling said frame, an auxiliary frame located between said side members and pivotally connected to the said front end member, means on said side members for tilting said auxiliary frame relative to said main frame, a pair of colters rotatably mounted on said auxiliary frame and adapted to sever the lateral roots of the stubble, a lifter shoe carried by said auxiliary frame rearwardly of said colters for raising said stubble from the ground, a first drum mounted on said auxiliary frame, said first drum having a plurality of rows of spaced staggered teeth for engaging the stubble as it is removed from the earth and breaking said stubble into relatively small pieces, means for driving said first drum, a shaker chain conveyor having one end pivotally connected to said lifter shoe for receiving material therefrom, a hopper for receiving stubble from said shaker chain conveyor, a tiller frame movably mounted on said main frame rearwardly of said auxiliary frame, means for raising and lowering said tiller frame, a second drum rotatably mounted on said tiller frame, said second drum having a plurality of radial knives for cultivating the soil, means for driving said second drum, a tiller blade mounted on said tiller frame rearwardly of said second drum for forming a furrow, a material chute for receiving material from said hopper and discharging such material into the furrow, a pair of spaced disks for moving earth into said furrow, and a packing wheel for compacting said earth, whereby sugar cane stubble will be removed from the earth after which the earth will be cultivated and the stubble will be replanted.

2. Apparatus for rejuvenating sugar cane stubble comprising a main frame having generally parallel side members connected by front and rear end members, means for propelling said frame, an auxiliary frame located between said side members and pivotally connected to said front end member, a lifter shoe carried by said auxiliary frame for raising said stubble from the earth, means on said auxiliary frame for engaging the stubble as it is removed from the earth and breaking said stubble into relatively small pieces, hopper means into which said relatively small pieces are discharged, a selectively movable tiller frame carried by said main frame, means on said tiller frame for cultivating the earth after the stubble has been removed, a tiller blade mounted on said tiller frame for forming a furrow, means for discharging pieces of stubble from said hopper into the furrow, a floating frame carried by said rear end member, a pair of spaced disks rotatably mounted on said floating frame for moving earth into said furrow, and means for packing the earth about said pieces of stubble, whereby relatively large pieces of sugar cane stubble will be removed from the earth by said auxiliary frame after which the earth will be cultivated by said tiller frame and the stubble will be replanted by said floating frame.

3. The structure of claim 2 in which said auxiliary frame includes a pair of pivotally mounted generally parallel arms, a pair of spaced colters rotatably mounted on said arms and adapted to sever the lateral roots of said stubble, and means on said main frame for tilting said auxiliary frame.

4. The structure of claim 2 in which said means for breaking said stubble into relatively small pieces includes a drum having a plurality of rows of spaced teeth, and means for driving said drum.

5. The structure of claim 4 in which said drum is urged downwardly by spring means.

6. The structure of claim 2 in which said tiller frame includes a drum rotatably mounted on said tiller frame, a plurality of generally U-shaped knives extending radially outwardly of said drum, and means for driving said drum.

7. The structure of claim 6 including link means pivotally supporting said tiller frame, and fluid means for selectively raising and lowering said tiller frame by means of said link means.

8. The structure of claim 2 in which said disks are urged downwardly by spring pressure.

9. The structure of claim 2 in which said means for packing the earth includes a packing wheel, and means on said main frame for raising and lowering said floating frame and controlling the tension on said packing wheel.

10. The structure of claim 2 including hopper means for containing fertilizer, and a flexible discharge pipe for selectively adding fertilizer to said furrow or to said earth.

11. The structure of claim 2 including hopper means for containing insect and disease combatants, and means for discharging said insect and disease combatants into or onto the earth.

12. Apparatus for rejuvenating sugar can stubble comprising a main frame, an auxiliary frame connected to said main frame and having means for removing stubble from the earth and breaking the same into smaller pieces, a tiller frame having soil tilling means thereon carried by said main frame, means for dispensing the smaller pieces of stubble onto the earth rearwardly of said tiller frame, a floating frame pivotally mounted on said main frame rearwardly of said stubble dispensing means, soil covering and compacting means carried by said floating frame, and means on said main frame for selectively operating each of said auxiliary frame, tiller frame and floating frame, whereby sugar cane stubble is removed from the earth, the earth is cultivated, and the can stubble is replanted.

References Cited by the Examiner

UNITED STATES PATENTS

| | | | |
|---|---|---|---|
| 1,802,536 | 4/1931 | Romera | 171—6 |
| 2,537,198 | 1/1951 | Wetzel et al. | 171—5 |
| 2,950,566 | 8/1960 | Henry | 47—1.42 |
| 3,073,265 | 1/1963 | Movilla et al. | 111—3 |

ABRAHAM G. STONE, *Primary Examiner.*

R. E. BAGWILL, *Assistant Examiner.*